(12) United States Patent
Kullenberg

(10) Patent No.: US 9,765,648 B2
(45) Date of Patent: Sep. 19, 2017

(54) GAS TURBINE ENGINE COMPONENT

(75) Inventor: Fredrik Kullenberg, Vänersborg (SE)

(73) Assignee: GKN Aerospace Sweden AB, Trollhättan (SE)

( * ) Notice: Subject to any disclaimer, the term of this patent is extended or adjusted under 35 U.S.C. 154(b) by 625 days.

(21) Appl. No.: 14/362,704

(22) PCT Filed: Dec. 8, 2011

(86) PCT No.: PCT/SE2011/000225
§ 371 (c)(1),
(2), (4) Date: Jun. 4, 2014

(87) PCT Pub. No.: WO2013/085435
PCT Pub. Date: Jun. 13, 2013

(65) Prior Publication Data
US 2014/0341730 A1    Nov. 20, 2014

(51) Int. Cl.
| | |
|---|---|
| F01D 25/28 | (2006.01) |
| F01D 25/16 | (2006.01) |
| F01D 9/04 | (2006.01) |
| F02C 7/06 | (2006.01) |

(52) U.S. Cl.
CPC ............ *F01D 25/28* (2013.01); *F01D 9/041* (2013.01); *F01D 25/162* (2013.01); *F02C 7/06* (2013.01);
(Continued)

(58) Field of Classification Search
CPC ... F01D 9/02; F01D 9/04; F01D 9/041; F01D 25/28; F01D 25/162
(Continued)

(56) References Cited

U.S. PATENT DOCUMENTS

| | | | |
|---|---|---|---|
| 5,483,792 A | 1/1996 | Czachor et al. | |
| 5,941,683 A | * 8/1999 | Ridyard | ................ F01D 25/162 415/142 |

(Continued)

FOREIGN PATENT DOCUMENTS

| | | |
|---|---|---|
| EP | 0344877 A1 | 12/1989 |
| EP | 1247944 A2 | 9/2002 |

(Continued)

OTHER PUBLICATIONS

PCT International Search Report and Written Opinion (PCT/SE2001/000225) dated Jul. 5, 2012 (11 pages).

*Primary Examiner* — Gregory Anderson
*Assistant Examiner* — Cameron Corday
(74) *Attorney, Agent, or Firm* — Bejin Bieneman PLC

(57) ABSTRACT

The invention concerns a gas turbine engine component (27) comprising an outer ring (21), an inner ring (20), a plurality of circumferentially spaced elements (22) extending between the inner ring (20) and the outer ring (21), wherein a primary gas channel for axial gas flow is defined between the elements (22), wherein the component (27) has an inlet side for gas entrance and an outlet side for gas outflow, and an annular load transfer structure (23) positioned internally of the inner ring (20) for transferring loads between said elements (22) and a bearing structure (24) for a turbine shaft (11) positioned centrally in the component (27), wherein the annular load transfer structure (23) extends circumferentially along at least a part of an inner side of the inner ring (20) and inwards in a radial direction of the component (27), wherein the annular load transfer structure (23) has a first portion (23a) and a second portion (23b), and wherein the first portion (23a) is located closer to the inner ring (20) than the second portion (23b). The invention is characterized in that the first portion (23a) is radially inclined between a first position (30) in the vicinity of the inner ring (20) and an
(Continued)

axially displaced second position (31) and wherein the second portion (23*b*) extends from the second position (31) and is inclined in relation to the first portion (23*a*), and wherein the annular load transfer structure (23) is provided with a plurality of circumferentially spaced load carrying members (32) arranged at a side of the first portion (23*a*) axially facing in a direction towards the second position (31), wherein the load carrying members (32) are arranged to form a load carrying connection between the annular load transfer structure (23) and said elements (22) via the inner ring (20). The invention also concerns a gas turbine engine (1) comprising a component (27) of the above type.

14 Claims, 5 Drawing Sheets

(52) U.S. Cl.
CPC ...... *F05D 2240/12* (2013.01); *F05D 2240/90* (2013.01); *Y02T 50/671* (2013.01)

(58) Field of Classification Search
USPC .......................................................... 415/142
See application file for complete search history.

(56) References Cited

U.S. PATENT DOCUMENTS

| | | | | |
|---|---|---|---|---|
| 6,511,284 B2 * | 1/2003 | Darnell | ............ | F01D 9/065 415/115 |
| 6,612,807 B2 * | 9/2003 | Czachor | ............ | F01D 9/065 415/116 |
| 7,594,404 B2 * | 9/2009 | Somanath | ............ | F01D 25/162 415/213.1 |
| 7,762,087 B2 * | 7/2010 | Somanath | ............ | F01D 25/162 415/139 |
| 2004/0103534 A1 | 6/2004 | Lundgren et al. | | |
| 2008/0022692 A1 | 1/2008 | Nagendra et al. | | |
| 2008/0134687 A1 * | 6/2008 | Kumar | ............ | F01D 25/162 60/796 |
| 2009/0101787 A1 | 4/2009 | Dierberger | | |
| 2010/0132369 A1 * | 6/2010 | Durocher | ............ | F01D 9/065 60/796 |

FOREIGN PATENT DOCUMENTS

| | | |
|---|---|---|
| EP | 1482130 | 12/2004 |
| EP | 1845237 | 10/2007 |
| EP | 1930555 | 6/2008 |
| EP | 2148046 | 1/2010 |
| EP | 2233697 A2 | 9/2010 |
| GB | 918692 A | 2/1963 |
| GB | 2226086 A | 6/1990 |
| GB | 2226600 A | 7/1990 |
| WO | 2004016911 A1 | 2/2004 |
| WO | 2005012696 A1 | 2/2005 |
| WO | 2005116405 A1 | 12/2005 |
| WO | 2010123413 A1 | 10/2010 |

* cited by examiner

GAS TURBINE ENGINE COMPONENT

CROSS-REFERENCE TO RELATED APPLICATION

This application claims priority to, and is a National Phase of, International Application No. PCT/SE2011/000225, filed on Dec. 8, 2011, which application is hereby incorporated by reference in its entirety.

BACKGROUND

An axial gas turbine engine, such as an aircraft "jet-engine", generally comprises an air inlet, a compressor section, a fuel combustion chamber, a turbine section, one or several rotatable drive shafts connecting corresponding compressors and turbines, an exhaust outlet and structures for supporting the drive shafts and for mounting the engine to e.g. an aircraft.

Typically, the supporting structures are static parts that include an inner shell or ring, for connection to bearings and a centrally located drive shaft, and an outer shell or ring, for connection to an engine casing or external mounting points, and where circumferentially distributed struts extend between and connect the inner and outer shells/rings. The supporting structures are designed to be capable of transferring loads between the drive shaft and the engine casing/mounting points. An axial gas flow through the engine is allowed to flow between the struts which normally are aerodynamically designed. Supporting structures of the type discussed here are exposed to rather severe unbalance loads and thermally generated loads.

The part of the supporting structure positioned inside of the inner ring, i.e. the part that transfer loads between the shaft bearing seats and the inner ring, includes normally an annular load transferring structure that is fastened to an inner side of the inner ring and that extends inwards in a radial direction towards the shaft bearings. Typically, this annular load transferring structure extends both radially and axially as to form a cone-shaped member, such as the bearing cones shown in US 2008/0134687 and US 2008/0022692.

Different designs of such load transferring structures are known and these can be divided into open and closed structures, where the term "open" refers to the possibility to allow for inspection (to detect damages etc.). A conventional bearing cone normally forms an open structure that can be inspected from both sides. EP 1482130 shows an example of an at least partly closed structure. Closed structures can more easily be designed to withstand high loads but since the possibility of inspecting load-carrying parts is highly desired, in particular in aircraft applications, open structures are generally preferred. In aircraft applications it is also important to reduce the weight of the structures used.

Conventional bearing cones are simple and cost-effective to produce but sometimes give rise to a limited durability of the supporting structure because of generation of high local stresses. Another known open annular load transferring structure comprises first and second parallel annular beam elements that are connected to the inner side of the inner ring at an axial distance from each other. The forward/upstream annular beam is in turn connected to the shaft bearing seat. A number of circumferentially distributed ribs are provided that connect the two annular beam elements for the purpose of preventing them from being bent in an axial direction and thus retaining the shape of the elements. In many cases this open structure works well but it has been discovered that in some applications also this design leads to very high local stresses that may affect the durability of the entire supporting structure.

There is a need for supporting structures of the above type that has an improved durability.

SUMMARY

A supporting structure for a gas turbine engine that exhibits improved durability compared to conventional structures is disclosed herein.

A gas turbine engine component comprises an outer ring, an inner ring, a plurality of circumferentially spaced elements extending between the inner ring and the outer ring, wherein a primary gas channel for axial gas flow is defined between the elements, wherein the component has an inlet side for gas entrance and an outlet side for gas outflow, and an annular load transfer structure positioned internally of the inner ring for transferring loads between said elements and a bearing structure for a turbine shaft positioned centrally in the component, wherein the annular load transfer structure extends circumferentially along at least a part of an inner side of the inner ring and inwards in a radial direction of the component, wherein the annular load transfer structure has a first portion and a second portion, and wherein the first portion is located closer to the inner ring than the second portion.

The invention is characterized in that the first portion is radially inclined between a first position in the vicinity of the inner ring and an axially displaced second position and wherein the second portion extends from the second position and is inclined in relation to the first portion, and wherein the annular load transfer structure is provided with a plurality of circumferentially spaced load carrying members arranged at the side of the first portion axially facing in a direction towards the second position, wherein the load carrying members are arranged to form a load carrying connection between the bearing structure and said elements via the inner ring.

By providing the annular load transfer structure with the inclined portions and by supporting the first, inclined portion with the load carrying members, it is possible to distribute the load more uniformly than with known open structures, which in turn leads to an improved durability. In such known structures, the load close to the inner ring is to a large or full extent carried by the first portion of the annular load transfer structure typically leading to a very high local stress in an inner and forward/upstream part (close to the inner ring) of an element (strut) positioned on the opposite, outer side of the inner ring.

In the component disclosed herein, this load is mainly carried by the load carrying members. Because of the inclination of the first portion and the arrangement of the load carrying members, the load becomes distributed over an axial length of the load carrying members, instead of being concentrated in the outer part of the first portion, which reduces the local load maximum, in particular in the inner and forward/upstream part of the strut. Further, the local load maximum becomes located at a point some radial distance from the inner ring and some axial distance from a connection between the first portion and the inner ring, at a point where the load carrying members no longer support the first portion.

That the load carrying members move the point of maximum load of the annular load transfer structure from the vicinity of the inner ring towards the center of the component means that the point of maximum load is moved to an area where the temperature is lower. This improves the strength of the annular load transfer structure. Moreover, the space inside of the inner ring is independent of aerodesign constraints and this simplifies the design of the part exposed to the maximum load compared to the case where the maximum load is located in a part of the strut.

Further, because the load carrying members move the stiffening point of the annual load transfer structure towards the center of the component (towards the center of toroid momentum), it leads to reduced toroid deformations.

Owing to the more uniform distribution of the load it becomes possible to form a thinner welding interface with a more even thickness between the inner ring and the struts.

Further, the component enables a better distribution of the loads in the inner ring both radially and circumferentially since the load carrying members become the main elements for distributing the loads to and from the struts.

In an embodiment each load carrying member extends in a radial direction along the side of the first portion and wherein each load carrying member extends also in an axial direction along the inner side of the inner ring. The load carrying members may be allowed to extend along the entire first portion so that the load at that point can be transferred to the second portion.

The load carrying member is firmly connected to the inner ring in a load transmitting manner. The load carrying member may be firmly connected to the first portion in a load transmitting manner. There may be a continuous connection between the load carrying member and the first portion from the first position to the second position.

In an embodiment each of the load carrying members has a plate-like shape, wherein a first edge side of the load carrying member extends along the side of the first portion, and wherein another edge side of the load carrying member extends in an axial direction along the inner side of the inner ring.

The load carrying member may have the shape of a triangle, wherein a third edge side of the load carrying member extends between the second position and a third position at the inner ring. There may be a continuous connection between the load carrying member and the inner ring from the first position to the third position.

In an embodiment each load carrying member is positioned radially inwards of a corresponding element located on an opposite, outer side of the inner ring such that a load can be transferred in a substantially straight radial direction between a certain load carrying member and its corresponding element.

In an embodiment an axial extension of the load carrying member along the inner ring substantially corresponds to at least a part of an axial extension of the corresponding element along the opposite side of the inner ring.

In an embodiment the load carrying members are arranged in a set of pairs, wherein each of said set of pairs are positioned radially inwards of a corresponding element located on an opposite, outer side of the inner ring such that a load can be transferred in a substantially straight radial direction between a certain pair of load carrying members and an element corresponding to said pair.

In an embodiment an axial extension of the load carrying members in each of the pairs along the inner ring substantially corresponds to an axial extension of a first and second side, respectively, of the corresponding element along the opposite side of the inner ring.

In an embodiment the two load carrying members in the pairs are inclined towards each other such that the distance between the two load carrying members increases in a radial direction towards a center point of the component.

In an embodiment the load carrying members extend along the first portion from the first position to the second position.

In an embodiment the annular load transfer structure is directly or indirectly connected to the shaft bearing structure.

In an embodiment the second position is located axially downstream of the first position.

In an embodiment the second portion is radially inclined from the axially downstream position towards the inlet side of the component.

In an embodiment the load carrying members form an integral part of the annular load transfer structure.

In an embodiment the shaft bearing structure is positioned in an axial position forwards of the element in a primary gas flow direction through the component and that the second portion is inclined towards the bearing structure.

In an embodiment the first portion of the annular load transfer structure is substantially cone-shaped exhibiting a substantially straight path in an axial cross section.

In an embodiment the second portion of the annular load transfer structure is substantially cone-shaped exhibiting a substantially straight path in an axial cross section.

In an embodiment a point of connection between the first and second portions in said second position is substantially closer to the inner ring than to the bearing structure.

In an embodiment the first portion extends from a position in the vicinity of a leading edge of the element to said axial downstream position.

In an embodiment said second position is closer to a leading edge of the element than to a trailing edge of the element.

Further, a gas turbine engine may comprise a supporting structure of the above type. In a further embodiment, the gas turbine invention is arranged for propulsion of an aircraft.

BRIEF DESCRIPTION OF DRAWINGS

In the description of the invention given below reference is made to the following figure, in which.

DETAILED DESCRIPTION OF EXAMPLE EMBODIMENTS

Figure 1:
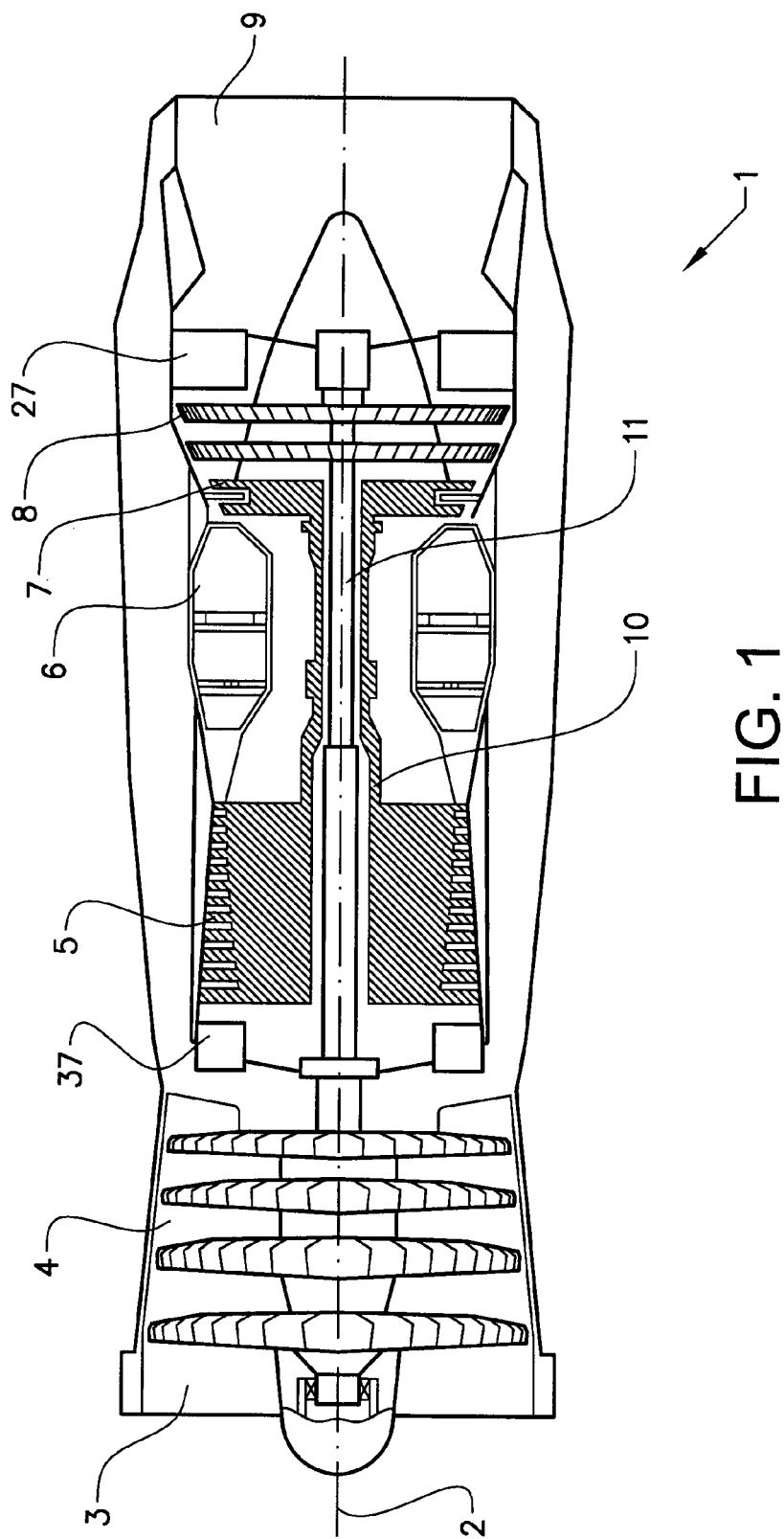
FIG. 1 shows, in a schematic overview, an example of an axial flow aircraft gas turbine engine provided with a gas turbine engine component.

FIG. 1 shows, in a schematic overview, an axial flow aircraft gas turbine engine 1 provided with supporting structures 27, 37. In general, the gas turbine engine 1 shown in FIG. 1 is of conventional construction and comprises, in axial flow series, an air intake 3, a low pressure compressor 4, a high pressure compressor 5, combustion equipment 6, a high pressure turbine 7, a low pressure turbine 8 and an exhaust outlet 9. During operation, the high pressure compressor 5 is driven by the high pressure turbine 7 via a first hollow shaft, the high pressure (HP) turbine shaft 10.

Similarly, the low pressure compressor 4 is driven by the low pressure turbine 8 via a second hollow shaft, the low pressure (LP) turbine shaft 11, which is coaxially disposed within the first turbine shaft 10. A common axis 2 is also shown.

The gas turbine engine 1 operates, in general, in a conventional manner whereby air drawn in through the air intake 3 is compressed by the low pressure compressor 4 before passing into the high pressure compressor 5 where it is further compressed. The compressed air then flows into the combustion equipment 6 where it is mixed with fuel and the mixture combusted. The resultant hot combustion products then expand through the high and low pressure turbines 7, 8 before being exhausted to the atmosphere through the exhaust outlet 9.

The engine 1 further comprises said rear supporting structure 27 and front supporting structure 37 for supporting the drive shafts and for mounting the engine to an aircraft.

The following is provided mainly with reference to the rear supporting structure 27. Such a supporting structure is commonly referred to as Turbine Rear Frame (TRF), Turbine Exhaust Case or Tail Bearing Housing.

Generally, rear support structures in jet engines support one or two shafts by means of roller bearings, i.e., only radial load is transmitted through the structure (axial load only at shaft fwd bearing). The load is transmitted through an inner support structure (support cone) to an inner hub connected to an outer structure (shroud) by means of radial "spokes", and further to engine mounts. In order to reduce aerodynamic drag or to straighten the outlet angle of the main gas flow leaving the low pressure turbine, these "spokes" are usually covered with an airfoil structure or made integral to the structure. Integrated airfoils or vanes are here called "struts". Struts are capable of supporting both aerodynamic loads as well as a combination of structural and thermal induced loads. Most of the modern jet engines utilize such struts in ring-strut-ring components, such as the rear supporting structure 27.

Figure 2:
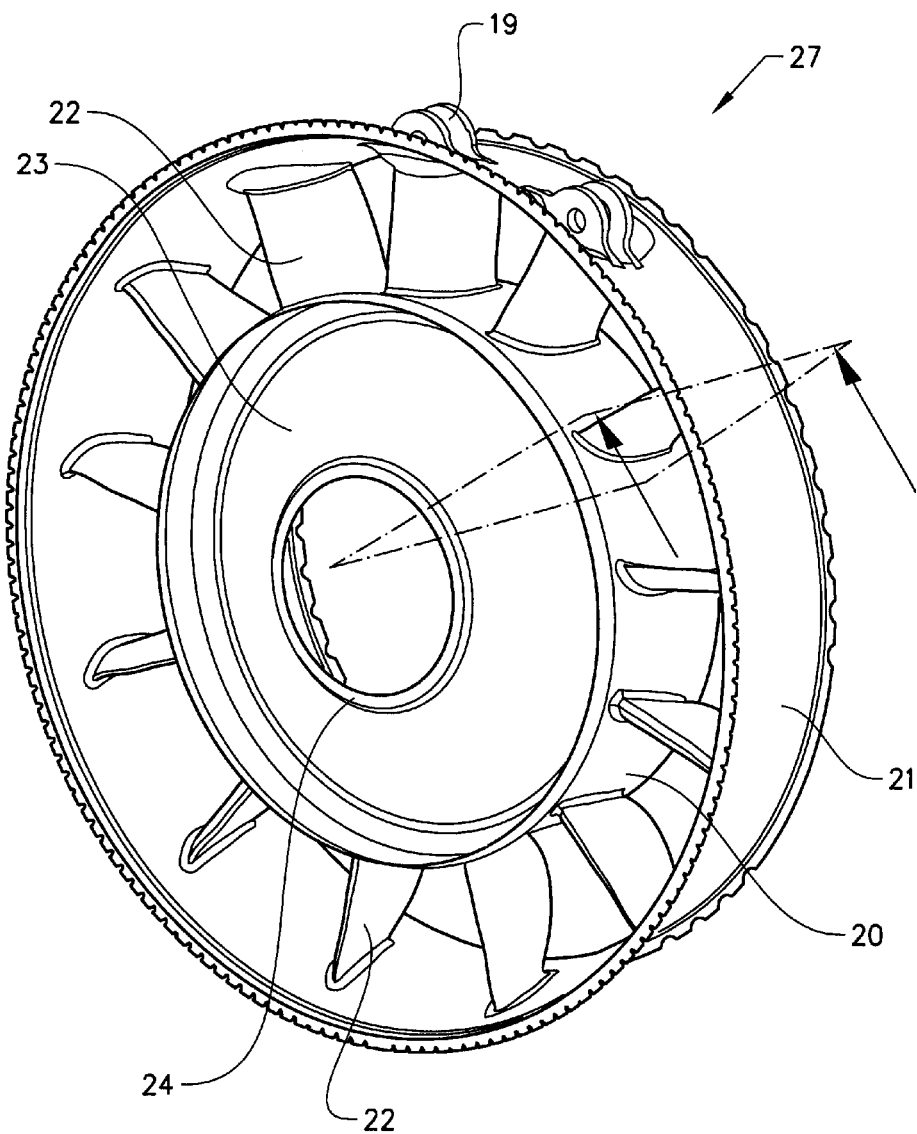
FIG. 2 shows, in a front perspective view, an example of an embodiment of the gas turbine engine component of FIG. 1.
Figure 3:
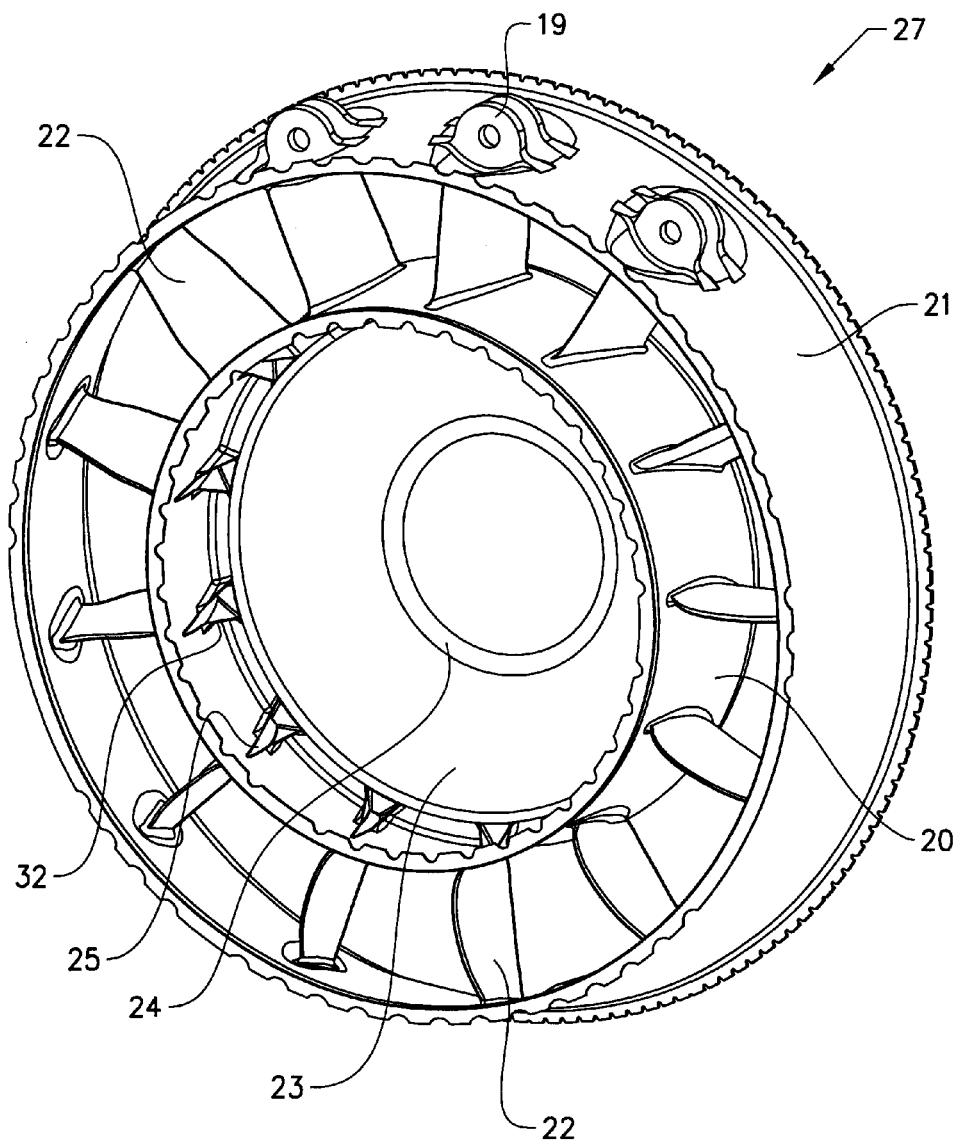
FIG. 3 shows a rear perspective view of the embodiment according to FIG. 2.

FIGS. 2 and 3 show perspective front and rear views, respectively, of an embodiment of the presently disclosed component, the rear supporting structure 27, comprising an inner annular member or ring 20 in the form of an inner housing or hub for receiving the second turbine drive shaft 11, and an outer annular member or ring 21, wherein the two annular members 20, 21 are concentrically arranged around the common axis 2. The supporting structure 27 further comprises a plurality of circumferentially spaced struts 22 that extend in a radial direction and connect the inner and outer annular members 20, 21. The struts 22 define gas flow passages and, in the example shown, each radial element 22 has an airfoil shape in cross section and is structurally integrated in the supporting structure 27. FIG. 2 shows a gas inlet side of the component 27, whereas FIG. 3 shows a gas outlet side.

An annular load transfer structure 23 is positioned internally of the inner ring 20 for transferring loads between the struts 22 and a bearing structure 24 for the turbine shaft 11 which is positioned centrally in the component 27. As shown in FIGS. 2 and 3, the annular load transfer structure 23 extends circumferentially along an inner side of the inner ring 20 and inwards in a radial direction of the component 27. The annular load transfer structure 23 also extends axially towards the shaft bearing structure 24 that is positioned in an axial position forwards/upstream of the struts 22 in a primary gas flow direction through the component 27.

As can be seen in FIG. 3 (and in FIGS. 4-5), a central part 25 of an underside of each strut protrudes through the inner side of the inner ring 20.

Engine mounts 19 are also shown in FIGS. 2-3.

Figure 4:
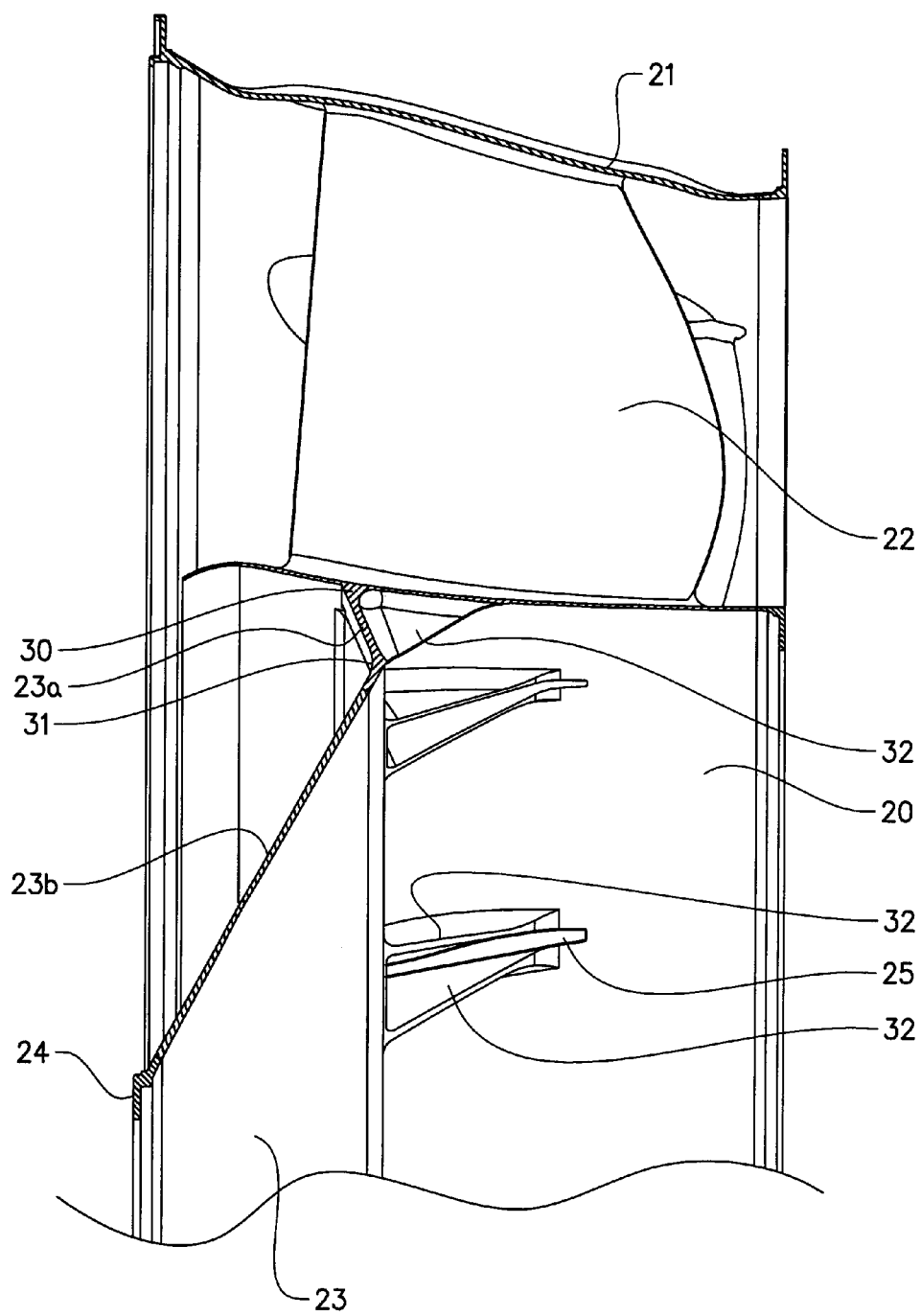
FIG. 4 shows a sectional view according to FIG. 2.
Figure 5:
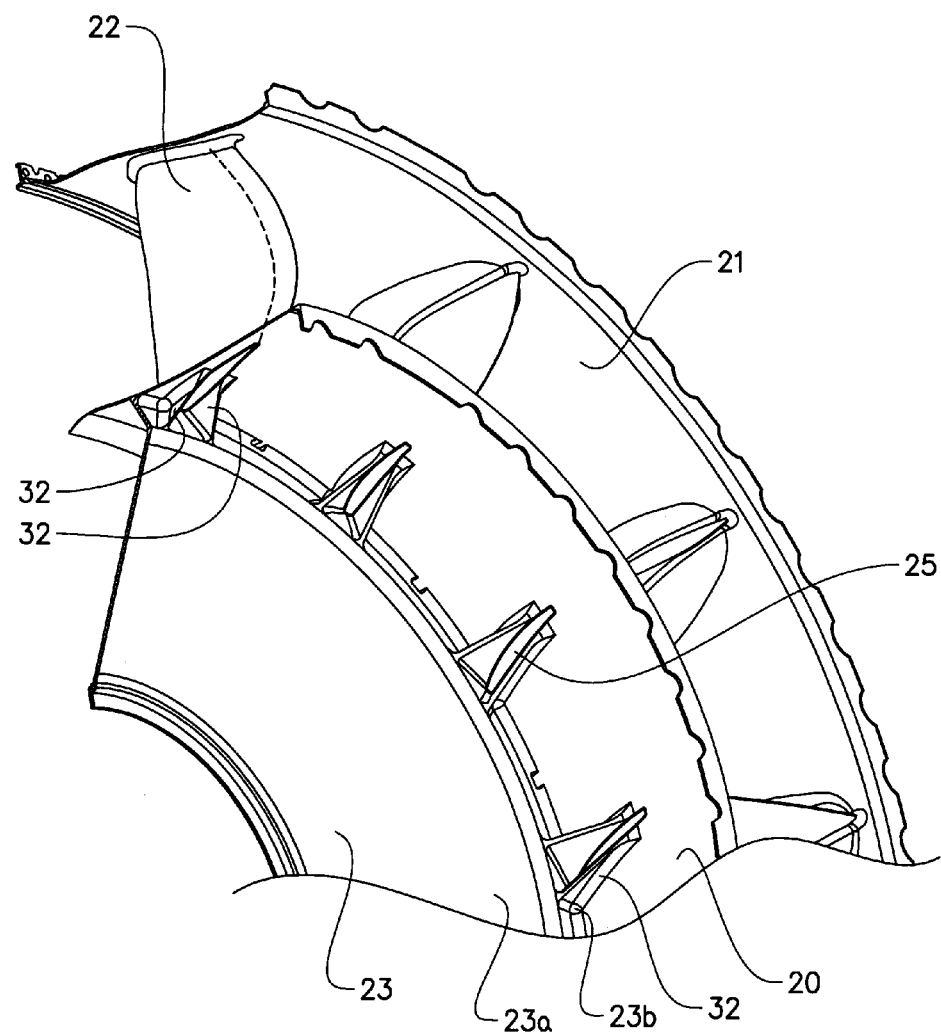
FIG. 5 shows a perspective sectional view according to FIG. 2.

FIGS. 4 and 5 show different views of a section of the component 27 according to the indication in FIG. 2. As shown clearly in FIG. 4, the annular load transfer structure 23 has a first portion 23a and a second portion 23b, wherein the first portion 23a is located closer to the inner ring 20 than the second portion 23. Both portions 23a, 23b are substantially straight (i.e. their cross sections are substantially straight as shown in FIGS. 4-5) and the first portion 23a is radially inclined between a first position 30 at the inner ring 20 and an axially downstream second position 31, where the first and second portions 23a, 23b connect in a bend. The second portion 23b extends from the second position 31 in a direction that is radially inclined towards the bearing structure 24 at the inlet side of the component 27. The second portion 23b is thus inclined also in relation to the first portion 23a.

The first portion 23a extends from a position in the vicinity of a leading edge of the struts 22, i.e. the upstream edge of the struts 22, towards the axial downstream position 31 which is closer to the leading edge of the struts 22 than to a trailing edge of the struts, i.e. the downstream edge of the struts 22.

The annular load transfer structure 23 is provided with a plurality of circumferentially spaced load carrying members 32 arranged at the outlet side of the first portion 23a axially facing in the direction of the second position 31, and are arranged to form a load carrying connection between the first portion 23a and the struts 22 via the inner ring 20. As can be seen in FIGS. 4-5 each load carrying member 32 has a plate-like shape, wherein a first edge side extends radially along the outlet side of the first portion 23a, from the first position 30 to the second position 31, and wherein another edge side extends in an axial direction along the inner side of the inner ring 20 to a point downstream of the second position 31.

In the example shown here, the load carrying members 32 are arranged in pairs, wherein each of the pairs and a corresponding strut 22 are positioned on opposite sides (inner side and outer side, respectively) of the inner ring 20 such that a load can be transferred in a substantially straight radial direction between a certain pair of load carrying members 32 and a strut 22 corresponding to said pair. An axial extension of the load carrying members 32 in each of the pairs along the inner ring 20 substantially corresponds to an axial extension of a first and second side wall, respectively, of the corresponding strut 22 along the opposite side of the inner ring 20. The struts 22 are hollow so that the load is transferred through their sides.

Further, the two load carrying members 32 in each pair are inclined towards each other such that the distance between the two load carrying members 32 increases in a radial direction towards a center point of the component 27.

The load carrying members 32 transfer the main part of the load between the struts 22 directly to/from the second portion 23b of the annular load transfer structure 23 which means that the first portion 23a does not have to carry much load. Further, the load carried by the load carrying members 32 is distributed along the axial length of the load carrying members 32. This reduces the local maximum stress. Because of the inclination between two load carrying members 32 in a pair the load is also advantageously redirected in a circumferential direction.

The load carrying members 32 form in this case an integral part of the annular load transfer structure 23 but may alternatively form separate parts or pairs fastened to the inner ring 20.

The annular load transfer structure 23 forms an open structure possible to inspect since the individual load carrying members 32 extend radially and axially (and not circumferentially).

The term plate-like means that the load carrying member 32 forms a wall structure with edge sides. The thickness of these members, i.e. the width of the edge sides, is sufficient for carrying the load. As shown above, the plate-like load carrying members 32 are inclined in relation to each other and to the plane of the side walls of the struts 22. A plate-like load carrying member 32 can be at least slightly curved but still sufficiently stiff.

The invention is not limited by the embodiments described above but can be modified in various ways within the scope of the claims. For instance, it is not limited to the rear frame structure (TEC/TRF) 27 as exemplified above. It is also applicable to other supporting structures in a gas turbine engine such as the front frame (inlet frame) 37, an intermediate case (IMC) or a turbine mid structure (TMF, TMS). Further, the invention is applicable to stationary gas turbines (power generators) as well as to flying jet engines.

The load carrying members 32 do not necessarily have to be arranged in pairs. However, when the elements/struts form hollow wall structures, as in the example described above, the load is transferred via their side walls to/from the inner ring. In such a case the load can be efficiently transferred by using pairs of plate-like load carrying members arranged radially inwards of a corresponding strut with an extension along the inner side of the inner ring corresponding to the extension of the two side walls of the vane on the outer side of the inner ring, thus so that the "footprints" of the pair of load carrying members on the inner side of the inner ring correspond to the footprints of the two vane side walls on the outer side of the inner ring. A solid load carrying member that extends also circumferentially, i.e. a block rather than a plate, may be capable of transferring such a load properly but would add to the weight compared to a pair of plates. The plate-like load carrying members may thus extend along a curved line along the inner side of the inner ring in correspondence with the curved side walls of the vane. To distribute the load circumferentially in the annular load transfer structure the plate-like load carrying members are inclined in relation to the radial direction of the vane side walls. The load carrying members may be at least partly curved.

That a part, such as the annular load transferring structure 23, is said to extend in one direction, e.g. a radial direction, does not exclude that it also extends in another direction, e.g. an axial direction.

That the axial extension of the load carrying members 32 in each of the pairs along the inner ring 20 substantially corresponds to the axial extension of a first and second side, respectively, of the corresponding element/strut 22 along the opposite side of the inner ring 20 does not mean that the load carrying members 32 extend along the entire axial length of the sides of the element 22. It means that the load carrying members 32 extend in the axial direction over a length that forms at least a portion of the axial length of the side walls of the strut 22, and over this length the upper, outer edge of the load carrying member 32 has a shape that substantially corresponds to the shape of the lower, inner edge of the strut side wall arranged outwards of (on top of) the load carrying member 32 so that the load can be transferred in a substantially straight radial direction. That is, the load carrying member 32 must not have exactly the same curvature or axial inclination as the corresponding strut side wall over this length.

The invention claimed is:

1. A gas turbine engine component, comprising:
   an outer ring;
   an inner ring; and
   a plurality of circumferentially spaced elements extending between the inner ring and the outer ring, wherein a primary gas channel for axial gas flow is defined between the elements,
   wherein the component has an inlet side for gas entrance and an outlet side for gas outflow, and an annular load transfer structure positioned internally with respect to the inner ring for transferring loads between said elements, and a bearing structure for a turbine shaft positioned centrally in the component,
   wherein:
   the annular load transfer structure extends circumferentially along at least a part of an inner side of the inner ring and inwards in a radial direction of the component, wherein the annular load transfer structure has a first portion and a second portion, and wherein the first portion is located closer to the inner ring than the second portion,
   the first portion is radially inclined between a first position in the vicinity of the inner ring and an axially displaced second position, and the second portion extends from the second position and is inclined in relation to the first portion,
   the annular load transfer structure is provided with a plurality of circumferentially spaced load carrying members arranged at a side of the first portion axially facing in a direction towards the second position, further wherein the load carrying members are arranged to form a load carrying connection between the bearing structure and said elements via the inner ring,
   the load carrying members are arranged in a set of pairs, wherein each of said set of pairs are positioned radially inwards of a corresponding element located on an opposite, outer side of the inner ring such that a load can be transferred in a substantially straight radial direction between a certain pair of load carrying members and an element corresponding to said pair, and
   the two load carrying members in the pairs are inclined towards each other such that the distance between the two load carrying members increases in a radial direction towards a center point of the component.

2. A gas turbine engine component according to claim 1, wherein each load carrying member extends in a radial direction along the side of the first portion, and each load carrying member extends also in an axial direction along the inner side of the inner ring.

3. A gas turbine engine component according to claim 1, wherein:
   each of the load carrying members has a plate-like shape,
   a first edge side of the load carrying member extends along the side of the first portion,
   another edge side of the load carrying member extends in an axial direction along the inner side of the inner ring.

4. A gas turbine engine component according to claim 1, wherein each load carrying member is positioned radially inwards of a corresponding element located on an opposite, outer side of the inner ring such that a load can be transferred in a substantially straight radial direction between a certain load carrying member and its corresponding element.

5. A gas turbine engine component according to claim 4, wherein an axial extension of the load carrying member along the inner ring substantially corresponds to at least a part of an axial extension of the corresponding element along the opposite side of the inner ring.

6. A gas turbine engine component according to claim 1, wherein an axial extension of the load carrying members in each of the pairs along the inner ring substantially corresponds to an axial extension of a first and second side, respectively, of the corresponding element along the opposite side of the inner ring.

7. A gas turbine engine component according to claim 1, wherein the load carrying members extend along the first portion from the first position to the second position.

8. A gas turbine engine component according to claim 1, wherein the second position is located axially downstream of the first position.

9. A gas turbine engine component according to claim 8, wherein the second portion is radially inclined from the axially downstream position towards the inlet side of the component.

10. A gas turbine engine component according to claim 1, wherein the load carrying members form an integral part of the annular load transfer structure.

11. A gas turbine engine component according to claim 1, wherein the shaft bearing structure is positioned in an axial position forwards of the element in a primary gas flow direction through the component and that the second portion is inclined towards the bearing structure.

12. A gas turbine engine component according to claim 1, wherein a point of connection between the first and second portions in said second position is substantially closer to the inner ring than to the bearing structure.

13. A gas turbine engine component according to claim 1, wherein the first portion extends from a position in the vicinity of a leading edge of the element to said second position.

14. A gas turbine engine comprising a component, wherein the component comprises:
an outer ring;
an inner ring; and
a plurality of circumferentially spaced elements extending between the inner ring and the outer ring, wherein a primary gas channel for axial gas flow is defined between the elements,
wherein the component has an inlet side for gas entrance and an outlet side for gas outflow, and an annular load transfer structure positioned internally with respect to the inner ring for transferring loads between said elements, and a bearing structure for a turbine shaft positioned centrally in the component,
wherein:
the annular load transfer structure extends circumferentially along at least a part of an inner side of the inner ring and inwards in a radial direction of the component, wherein the annular load transfer structure has a first portion and a second portion, and wherein the first portion is located closer to the inner ring than the second portion,
the first portion is radially inclined between a first position in the vicinity of the inner ring and an axially displaced second position, and the second portion extends from the second position and is inclined in relation to the first portion,
the annular load transfer structure is provided with a plurality of circumferentially spaced load carrying members arranged at a side of the first portion axially facing in a direction towards the second position, further wherein the load carrying members are arranged to form a load carrying connection between the bearing structure and said elements via the inner ring,
the load carrying members are arranged in a set of pairs, wherein each of said set of pairs are positioned radially inwards of a corresponding element located on an opposite, outer side of the inner ring such that a load can be transferred in a substantially straight radial direction between a certain pair of load carrying members and an element corresponding to said pair, and
the two load carrying members in the pairs are inclined towards each other such that the distance between the two load carrying members increases in a radial direction towards a center point of the component.

* * * * *